United States Patent [19]

Kaneko

[11] Patent Number: 4,505,068
[45] Date of Patent: Mar. 19, 1985

[54] HYDROPONIC METHOD AND APPARATUS FOR CULTIVATING VEGETABLES AND OTHER PLANTS

[76] Inventor: Toshiro Kaneko, 1397 Obama, Yaizu-shi, Shizuoka-ken, Japan

[21] Appl. No.: 467,818

[22] Filed: Feb. 18, 1983

[30] Foreign Application Priority Data

Feb. 20, 1982 [JP] Japan ............... 57-26523

[51] Int. Cl.³ .......................... A01G 31/02
[52] U.S. Cl. ................................ 47/59
[58] Field of Search ........ 47/17, 1.7, 1 A, 60, 47/59, 61, 65, 18, 19, 1.43; 222/485

[56] References Cited

U.S. PATENT DOCUMENTS

| | | | |
|---|---|---|---|
| 1,121,722 | 12/1914 | Fessenden | 47/17 |
| 3,412,938 | 11/1968 | Larson | 47/1.7 X |
| 3,481,073 | 12/1969 | Yoshida et al. | 47/17 |
| 3,579,907 | 5/1971 | Graves | 47/17 |
| 3,717,953 | 2/1973 | Kuhn et al. | 47/17 X |
| 3,718,533 | 2/1973 | Shibata | 47/17 X |
| 3,824,736 | 7/1974 | Davis | 47/17 |
| 4,028,847 | 6/1977 | Davis et al. | 47/65 |

FOREIGN PATENT DOCUMENTS 132303 9/1981 Japan .

Primary Examiner—Robert A. Hafer
Assistant Examiner—Danton DeMille
Attorney, Agent, or Firm—Robert E. Burns; Emmanuel J. Lobata; Bruce L. Adams

[57] ABSTRACT

The plants above are grown in a cultivation container from seeds or young plants to the condition of them enabling to harvest. The cultivation containers are transferred in sequence to each cultivation area from the cultivation starting region of the cultivation factory to the cultivation ending region every day or every cultivation hour. During the transfer of the plant, the plant to be cultivated in the cultivation containers are supplied with water by means of a water supply apparatus of cultivation liquid.

Application of light is restricted to the plant by a cover until the cultivation ending zone and light is applied to the plant at ending of the cultivation to grow them. Consequently, good plant and vegetables are obtained.

The seeds mentioned above are scattered in the cultivation containers through a seed scattering apparatus. The seed scattering apparatus is provided with a scale for measuring a unit volume of the seeds.

20 Claims, 25 Drawing Figures

HYDROPONIC METHOD AND APPARATUS FOR CULTIVATING VEGETABLES AND OTHER PLANTS

BACKGROUND OF THE INVENTION

1. Field of the Invention

This invention relates to a water cultivation method and an apparatus therefor for vegetables and other plants and, in particular, to a water cultivation method and an apparatus therefor for planting young plants such as "Kaiware Daikon", a kind of radish, and the like.

2. Description of the Prior Art

Various water cultivation methods and apparatus for producing vegetables and plants and the like are known. However, these conventional techniques require a large area and as a result a lot of money is necessary to construct and operate the cultivation factory. Furthermore, the conventional methods and apparatus need to be exposed to the sun in day time from the starting period of planting to the harvesting period of the vegetables, and accordingly, young plants such as the radish are apt to grow too fast.

SUMMARY OF THE INVENTION

One of the objects of the present invention is to provide a water cultivation method and an apparatus therefor enabling good plants to be mass produced effectively using a relatively small cultivation area, little installation, and available manpower.

Other objects of this invention and the effects and advantages of the invention will be apparent from the following embodiments and the characteristics of this invention will be described in the claims in particular.

DESCRIPTION OF THE PREFERRED EMBODIMENT

Figure 1:
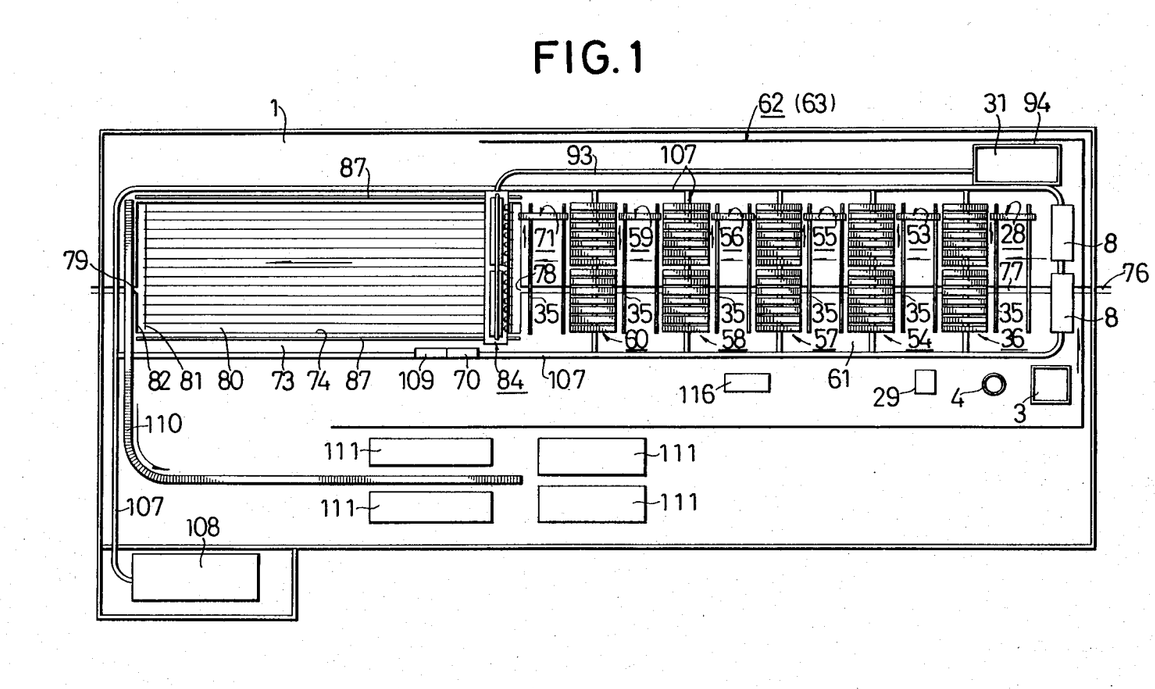
FIG. 1 shows a plan view of the outline of a cultivation factory and of the apparatus for carrying out the method of this invention.

This invention will be described by way of example with reference to cultivating "Kaiware Daikon," a kind of radish, and it is understood that the invention is likewise applicable for cultivating other kinds of plants. As shown in FIG. 1, the method of the present invention includes the steps of a preparation (3) for disinfecting the seeds of the radish along the direction of an arrow in the drawing, a scattering step (8) for scattering the seeds onto the cultivation containers, a cultivation step (61) for stacking the cultivation containers so as to be able to transfer and stack them in order every cultivation day or cultivation hour on the cultivation stands (36,54, 57, 58, 60) and limiting the light necessary for the cultivation of the plant in the containers, supplying cultivation liquid to grow them, a cultivation step (73) for the plants in which light and cultivation liquid are supplied, and a shipping step (111) for collecting the cultivation containers to ship the plants therein.

The steps referred to above are explained below in detail according to the order given above.

Figures 2, 3, 4, 6:
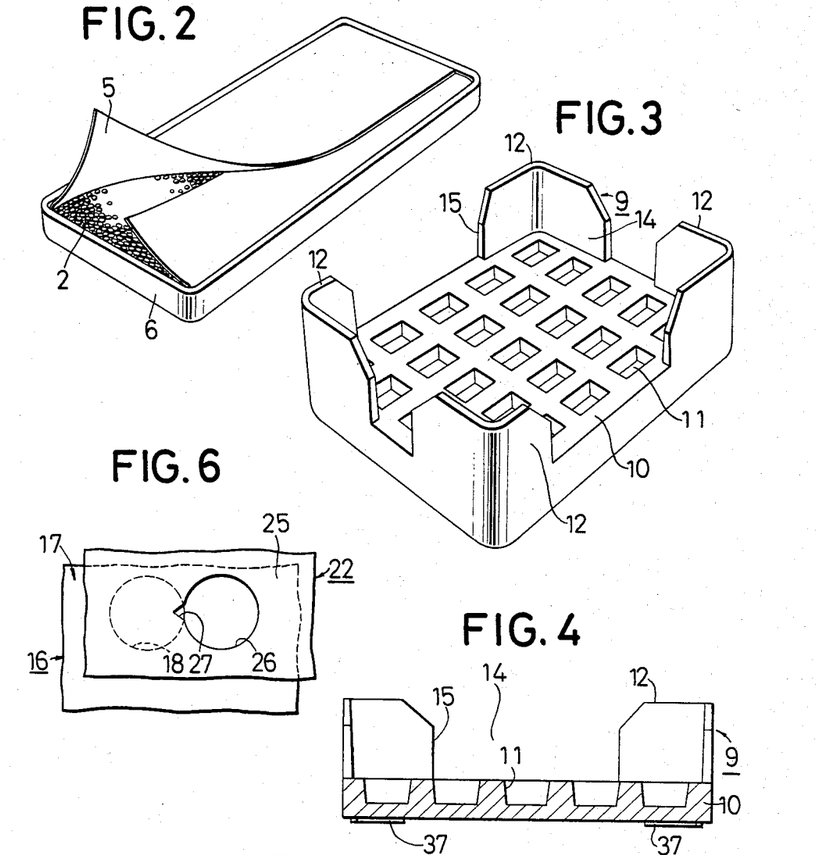
FIG. 2 is a perspective explanatory view showing how the seeds are contained in the seed containers in the cultivation factory and kept for a day and night.
FIG. 3 shows an enlarged perspective view of one of the cultivation containers used for cultivating seeds.
FIG. 4 is a cross sectional central enlarged view of the cultivation container.
FIG. 6 is an enlarged plan view of another embodiment of the apparatus for scaling and scattering the seeds in the container.
Figure 5:
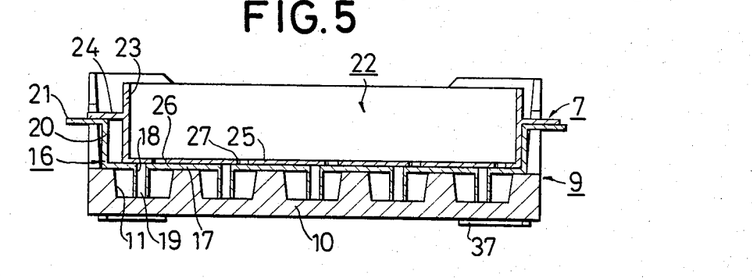
FIG. 5 shows a cross sectioned central enlarged view of the container and the seeds which are scaled and scattered in the container.
Figures 7, 8:
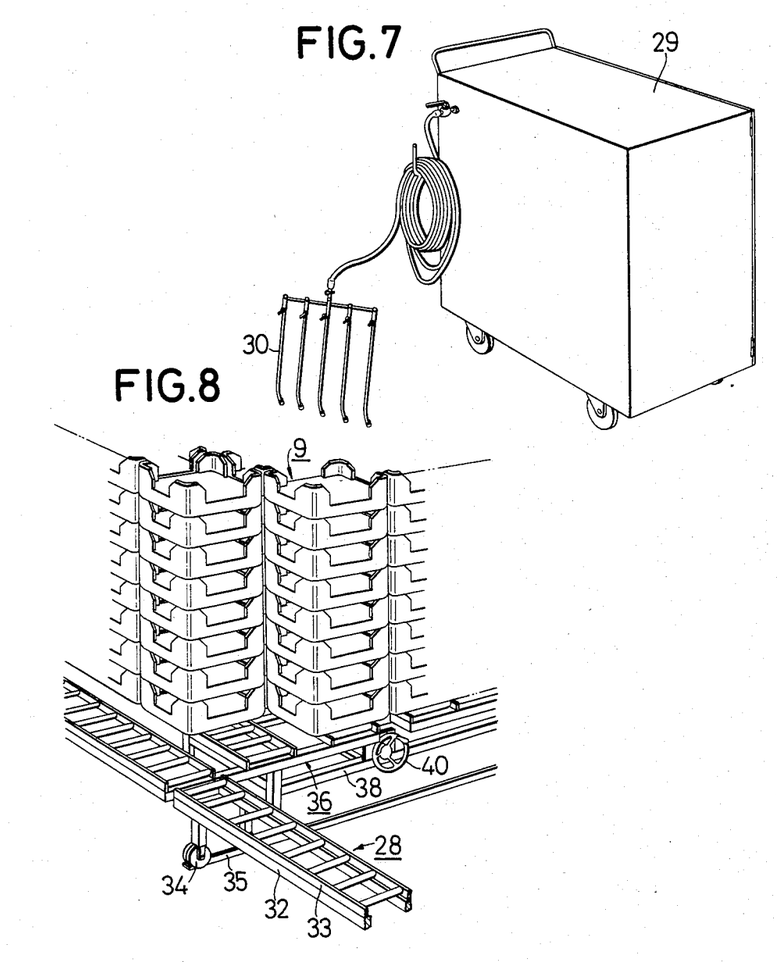
FIG. 7 shows a water supply device for supplying cultivation liquid to the plants grown from the seeds in the region of the cultivation factory before the cultivation ending period.
FIG. 8 is a perspective view of a part of a transfer stand for transfering the cultivation containers to a cultivation stand and the cultivation stand supporting the cultivation containers at their stacked condition.

Preparation Step (See FIGS. 1,2)

First of all, the seeds of the radish (2) are disinfected in a disinfection vessel (3) in the cultivation factory (1) installed within a room, then they are submerged in a warm water vessel (4) for 2-5 hours, and then dried. The seeds are wrapped with wet paper or cloth and the like (5) and kept about 12 hours or one night in a seed container (6), so that the seeds are going to bud before long.

Scattering Step See FIGS. 1,3-6, 10)

On the next day, the seeds are scaled in a scale device (7) as explained below on a working stand (8) to scatter them by a fixed volume on the base of a cultivation room (11) formed at a base portion (10) of the cultivation container (9), see FIGS. 3 and 4.

Figure 10:
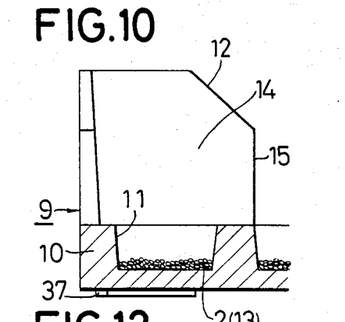
FIGS. 10-13 are partly enlarged sectional views showing in sequence the growing conditions of the cultivating plant.

The volume of the seeds to be scattered in the cultivation room is generally about 50-80 seeds (see FIG. 10). If necessary, the volume of seeds may be changed from 10-20 to 150-200 seeds so as to make the volume suitable for the specific distribution route and intended condition of use.

The cultivation container (9) has side walls (12) erected on the peripheral portions of the base portion to form a space (14) in which the seeds grow upwardly from the base portion (10). The side walls (12) have open portions (15) formed thereon to circulate air.

The cultivation container (9) is made of water-resisting material such as foamed styrol resin, various plastics and metals. The drawing shows a square shape of the cultivation room or compartment (11) however, oval and other suitable shapes may be used for the room. The side walls (12) can be made so as to have only one at a side of the wall of the open portion (15).

As shown in the drawing, the scale (7) FIG. 5 has a scale box body (16) fittable to the cultivation container (9). At a bottom (17) of the scale box (16), a seed scattering opening (18) corresponding to each of the cultivation rooms (11) of the cultivation container (9) is formed. At a lower portion of the seed scattering opening, is attached a scaling cylinder (19).

The side of the scale box (16) has a handle (21) formed thereon. When the scale box (16) is fitted on the cultivation counter (9) the handle extends into the open portion (15) of the side wall (12) of the cultivation container (9), and the scaling cylinders (19) project into respective rooms (11) of the cultivation container, so that the lower surface of each scaling cylinder (19) engages with the bottom of the corresponding room (11) of the cultivation container to close it. An openable member (22) of box like shape is contained within the scale box (16) and has an outwardly extending supporter member (24) at each opposed side wall (23) the member (24) is slidable on the handle (21) of the scale box (16) thereby making the openable member (22) slidable.

At the bottom portion (25) of the openable member (22) are formed openings (26) corresponding to the seed scattering opening (18) of the scale box (16). When the openable member (22) slides so as to coincide the openings (26) with respective ones of the feed scattering openings (18) of the scale box (16), the seeds are supplied to the rooms through the openings (26) and they are contained in the scaling cylinder (19) of the scale box (16).

When the cylinder (19) becomes full of the seeds the openable member (22) slides to close the seed scattering openings (18) of the scaling cylinders (19). Thus the volume of seed in each room (11) is scaled by the capacity formed by the interior bottom of the room (11) of the cultivation container (9) and the peripheral face of the scaling cylinder (19).

The excess seeds (2) are used to scatter on the openable member (22) at the next scattering operation. When the openable member (22) is drawn from the cultivation container (9) together with the scale box (16), the seeds become scattered within the cultivation rooms (11) of the cultivation container (9) as shown in FIG. 10. A notched portion (27) of a size of a seed is formed in the openable member (22) at the edge of each opening (26) so that during closing of the member no seed is apt to be sandwiched accidently by the openable member (22) thereby avoiding smashing or cutting of the seeds.

The seeds grow into seedlings or young plants directly in the rooms (11) of the cultivation container (9) as they are. The seeds or young plants may be scaled to various scales (not shown) by using other than the scaling apparatus (7). The opening of the feed scattering opening (18) of the scale box (16) can be accomplished by using a slidable plate (not shown) as well as other means and the like.

After the scaling and seed scattering, the cultivation container is placed on a first conveying stand (28) and a nozzle portion (30) of a water supply device (29) (see FIG. 7) is fed in sequence, facing the cultivation rooms (11) of the container (9), for supplying water or water including fertilizer or cultivation liquid (31). In this case, the liquid is sprayed to apply it to the seeds uniformaly.

Mineral water obtained by removing the bleaching constituents from water or by the supply of mineral ingredients to the cultivation liquid (31) is used and the mineral part is absorbed in the plant thereby obtaining plants of high nourishment and of good taste.

The first conveying stand (28) has a roller conveyer (33) as shown in FIG. 8 on a leg stand (32). The first conveying stand (28) is movable on wheels (34) mounted under the leg stand (32) and which travel on a rail (35) along the direction perpendicular to the conveying direction of the cultivation containers (9). It is possible to bridge only the roller conveyer (33) between a working stand (8) and the first cultivation stand (36).

After watering of the cultivation container (9) on the first conveying stand (28), the container is sent to the first cultivation stand (36) on the second day after the day of scattering seed to the cultivation starting region in the cultivation factory (1). The cultivation containers (9) are stacked on each other in sequence by engaging the protrusions (37) formed on the bottom underside of each container (9) with an upper edge of the side wall (12) of the container placed under the first container (9) (see FIG. 8).

The plants grown in the stacked containers (9) are watered again in the evening of the first day after the seed scattering day.

A handle (40) connected to a rotation shaft (39) supported on the stand (38) of the first cultivation stand (36) is rotated during watering of the plants as shown in FIG. 9, and the screw portion (41) formed on the rotating shaft (39) engages a rotatable screw hole portion (45) formed on the top end of an arm portion (44) of a lockable body (43) pivoted to a pivot shaft (42) of the stand (38), so that a clockwise rotation, as viewed in FIG. 9, of the arm portion (44) rotates the operative arm (46) provided at an end of the lockable body (43) in to clockwise direction. Rollers (47) provided at the end of the operative arm (46) are guided within a long groove (50) of a supporting frame (49) held on the pivotable stand (48) fixed on a floor, consequently the first cultivation stand (36) is slanted or inclined as shown in dashed lines so as to cause the stacked containers (9) to slide to a second conveying stand (53) as explained below.

As a result of tilting the cultivation stand (36), the cultivation containers (9) slide along a roller conveyer or wheel conveyer, sliding rollers, sliding plates or other supporting member (51) fixed on the supporting frame (49) and the stacked containers stop by means of a stopper (52) provided at an end of the supporting member.

Here the group of stacked cultivation containers on the first cultivation stand (36) are removed and are arranged on the second conveying stand (53) in a flat pattern. The cultivation liquid (31) from the water supply device (29) is sprayed and supplied to the plants. The remaining stacked groups of the cultivation containers are in sequence supplied in this manner and the cultivation containers (9) are transfered and stacked on a second cultivation stand (54).

Water supplying steps are carried out in the morning and evening of the second day upon the plants in the cultivation containers (9) using a third conveying stand (55) and a fourth conveying stand (56). The cultivation containers (9) are moved from the second cultivation stand (54) to the third cultivation stand (57) and then, from the third stand to the fourth cultivation stand (58). On the third day, they are conveyed to a fifth cultivation stand (60) using a fifth conveying stand (59) in the morning of the day.

The cultivation stands (36,54,57,58,60) all able to slant or incline and are the stationary type (not shown). The cultivation containers (9) can be arranged flat on the cultivation stands.

A cover (62) is formed in a cultivation start region (61) for cultivating the plants on the cultivation stands (36,54,57,58,60). As shown, the cover comprises a cover member (63) for limiting light, the cover member being made from cheese cloth, formed and fabricated net, synthetic resin sheet, fabric or the like and being extended from the ceiling and the side walls of the cultivation region (61). Consequently, the sun light necessary to cultivate the plants (13) in the cultivation containers (9) can be controllably limited or stopped. A warming member (64) for retaining the warmth and made of any synthetic resin sheet or cloth is applied to the interior of the light-limiting cover (63) and a drop prevention cover (65) made of the material effective to absorb water is provided.

If the light-limiting cover (63) and the drop prevention cover (65) have sufficient ability for holding warmth, the warmth keeping cover (64) can be omitted and it is possible to make the light-limiting cover (63) to have efficiency for drop prevention or warmth holding capacity. The light-limiting cover (63) or the warming cover (64) can be placed over another one.

The cover (62) is attached to a driving wire (67) extended between a set of pulleys (66) and a drum (68) having the wire wound around it rotates in the forward direction and a reverse direction to open or shut it. The opening and closing operation of the cover (62) is effected through a control board (70).

Figure 11:
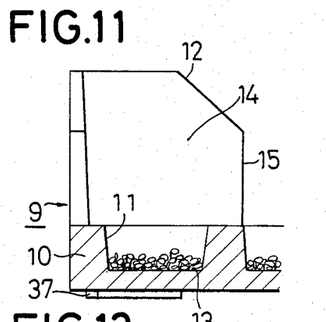
Figure 12:
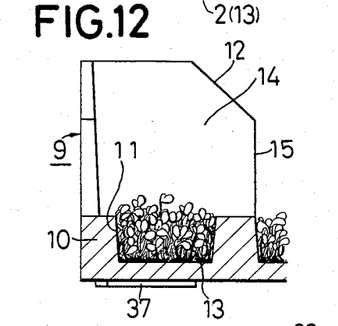
Figure 13:
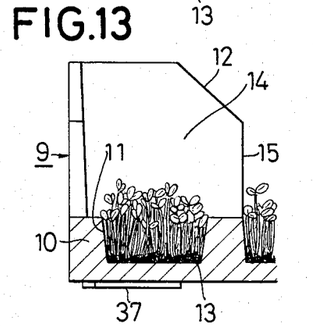

Consequently, the plants in the cultivation container (9) grow and grow every day limited under the condition of lighting and reach a height of about 6-8 cm in 3-4 days according to the cultivation season, place and environment, and in particular, the plant stems are grown thin (see FIGS. 11-13).

In the evening of the third day, the cultivation containers (9) having the plants cultivated therein on the fifth cultivation stand (60) are conveyed to the cultivation ending region (73) of the cultivation factory (1) through a suitable bridge plate (72) on the sixth conveying stand (71) arranged slantly. Then the cultivation containers (9) are arranged flat on the conveying stand (71).

If the plants in the cultivation stands (36,54,57,58,60) grow rapidly, the cultivation containers (9) arranged in a flat condition can be conveyed directly to the cultivation ending region (73) during the watering of the cultivation stands (36,54,57,58).

Cultivation Step at Condition having sufficient light (see FIGS. 1,16-19)

The plants (13) are further cultivated after arrival at the cultivation ending region (73) using cultivation light such as sun light.

Figures 9, 14:
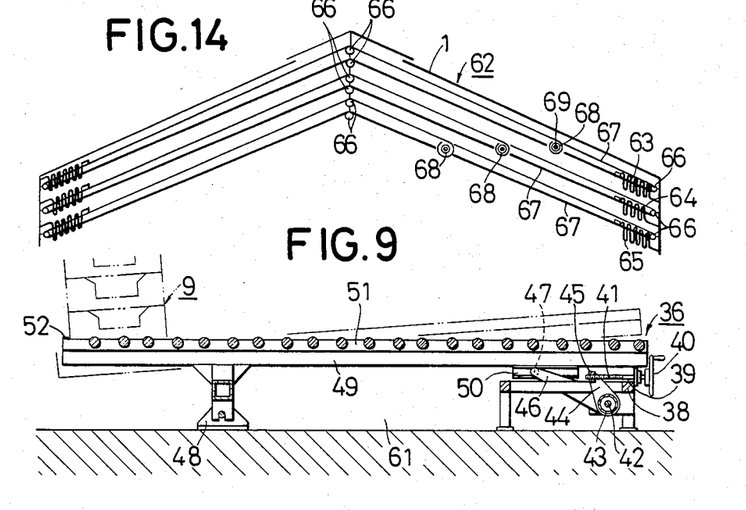
FIG. 9 is a sectional view of the cultivation stand in its slanted condition.
FIG. 14 shows a front view of a cover applied over the plants for restricting the light necessary to cultivate them.

The cultivation ending region (73) is formed in the shape of a shallow water pool (74) and the cultivation containers (9) float on the water surface (75) (see FIG. 9).

The cultivation containers (9) shown in the drawing are made of foamed plastic material so as to be floatable on water, however the containers may be made of plastic material or metal of a construction on water.

The water in the pool (74) is flown in from a flowing port (78) through a groove (77) formed in the cultivation region (61) from a water passage entrance (76) and flown out by gravity through a flowing out port (79).

Figures 15, 16, 19:
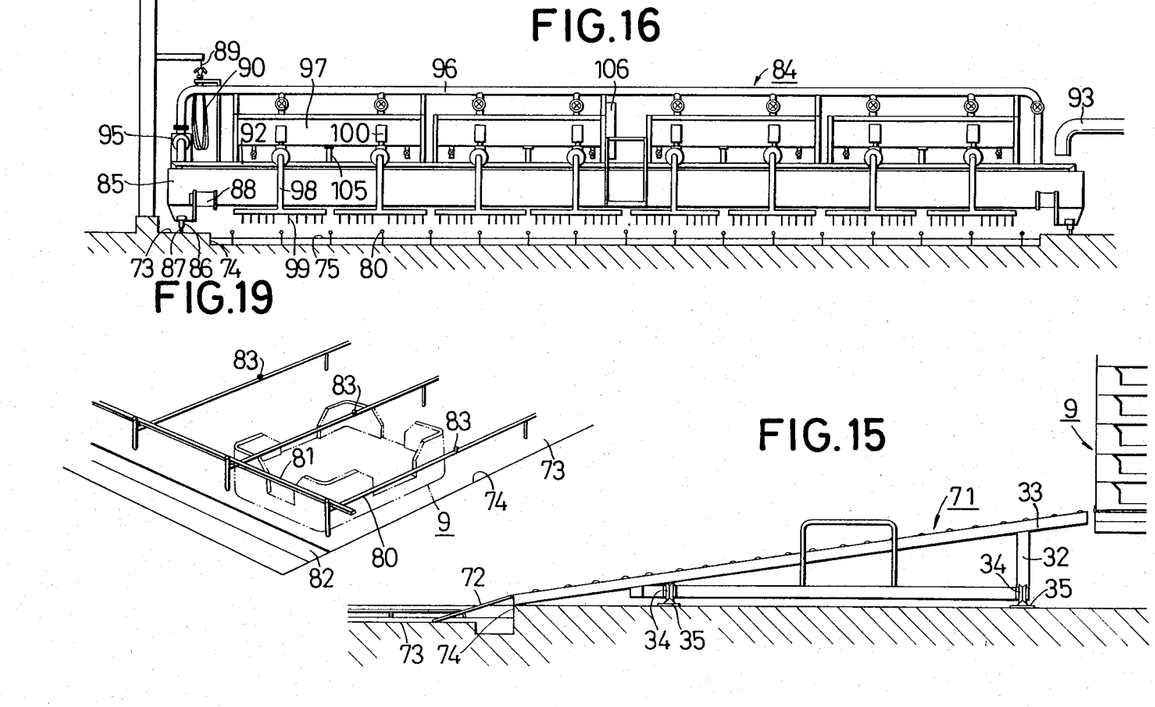
FIG. 15 is a side view of the transfer stand conveying the cultivation containers to the cultivation ending region.
FIG. 16 is a front view of the water supplying device for applying cultivation liquid to the plants in the cultivation ending region of the cultivation factory.
FIG. 19 shows an enlarged perspective view of the holding condition of the plant cultivation container in the cultivation ending region of the cultivation factory.

The cultivation containers (9) travel and are guided along by the water flowing motion and a partition frame (80) formed within the water pool (74) and the containers are stopped by contacting a stoppage member (81) provided at an end of the partition frame (see FIG. 19). When there is no stoppage member (81), the cultivation container (9) strikes an edge portion (82) of the water pool (74) and stopped.

When an engagement portion (83) is formed at a suitable positions on the partition frame (80), the stoppage member (81) can be engaged on the engagement portion to stop the cultivation containers (9) at any suitable position determined according to the number of the cultivation containers.

In order to stay the water within the pool (74), in this case the cultivation containers (9) can be moved by pushing them along the travelling direction.

The containers (9) can also be moved by means of magnetic action, air floating system, roller conveyer and the like (not shown).

Water can be supplied automatically to the cultivation ending region (73) through a water supply device (84) (see FIG. 1).

Figure 17:
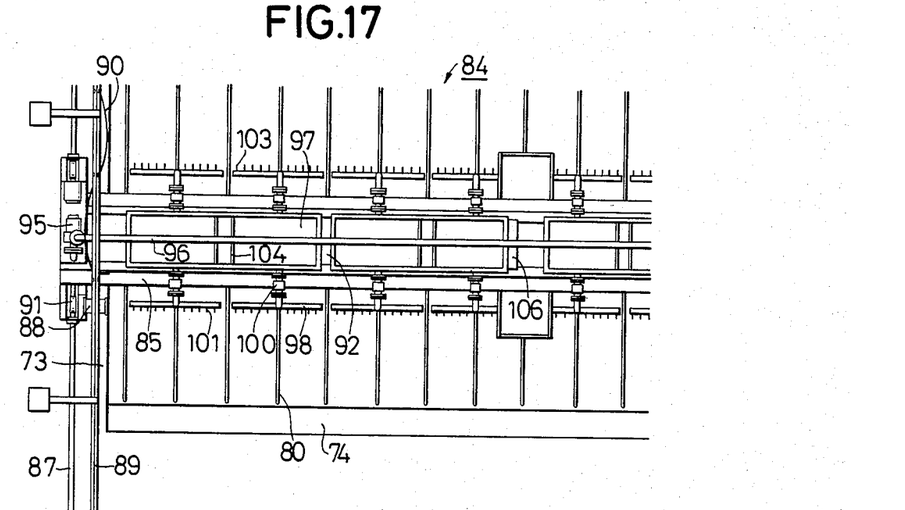
FIG. 17 is a partly enlarged plan view of the water supplying device.
Figure 18:
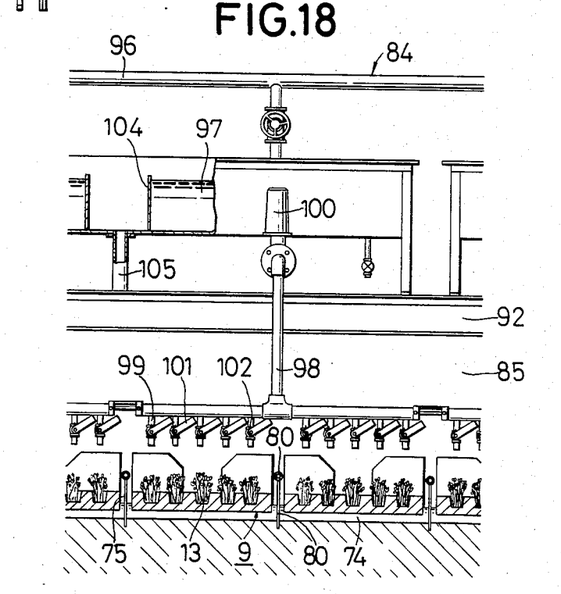
FIG. 18 is a partly enlarged sectional view showing the supplying condition of the water supplying device.

As shown in detail in FIGS. 16-18, the water supply device (84) has a base (85) installed on the water pool (74) and wheels (86) fixed on both the ends of the water pool (74) rotate along rails (87) placed along the sides of the water pool (74).

Electricity is supplied to a motor (88) installed on the base (85) through a cable (90) supported on the travelling curtain rail (89) to drive the wheels (86) through a speed reducer (91) connected to the motor (88).

A water reservoir tank (92) is installed on the base (85) and is supplied with cultivation liquid (31) such as mineral water and the like from the water supply tank (94) (see FIG. 1) through a water pipe (93).

The cultivation liquid (31) within the water tank (92) is sucked up through a pump (95) and sent to a water distribution tank (97) on the water tank (92) through a water pipe (96), and the cultivation liquid (31) flows down into the plants within the cultivation containers (9) from nozzles (99) through the water tank (92) and a conduit (98).

The size of the nozzles diameter and the distance between the nozzles and the cultivation containers (9)

are determined so as to widely scatter the cultivation liquid (31) flown out of the nozzles (99). Thus the cultivation liquid (31) does not scatter and instead is supplied in an evenly sprayed condition.

The flowing out and the stoppage of the cultivation liquid (31) to the nozzles (99) are controlled by valve means of such as a ball valve (100), magnetic or solenoid valve or the like and adjusted through a graduation (102) on the cock (101) formed on each nozzle (99).

When a large volume of cultivation liquid (31) is need, the liquid can be flown through a nozzle (103) as shown in FIG. 17 having a large diameter installed at the opposite side of the nozzle (99).

After overflowing the partition plate (104) formed within the water distribution tank (97), the cultivation liquid (31) returns to the water tank (92) through a returning pipe (105) as shown in FIG. 18. Water is supplied to the supply tank (92) from the water supply tank (94).

Watering of the plants in the cultivation containers (9) in the cultivation ending region (73) is carried out by means of manipulating a button on the control board (106) once at morning and once at evening. When the plants in the containers grow rapidly, the time between two button manipulations can be reduced (see FIG. 16).

To the cultivation ending region (73) of the cultivation factory (1), artificial sun light (not shown in the drawing) can be applied to shorten the cultivation period of the plants (13) in the containers (9).

A heating pipe (107) is arranged within the cultivation factory (1) and hot or warm water is flown through the pipe by means of a boiler apparatus (108) connected to the heating pipe in order to control the temperature and humidity in the room through a control board (109) (see FIG. 1).

The cultivation process has been explained for being carried out indoors and the process can also be carried out outdoors.

The plants (13) cultivated in the cultivation ending region (73) for a half day or one day grow to a height of about 7 cm–10 cm and the leaves become light green.

The seeds change in the cultivation rooms from the time of their scattering on the cultivation rooms (11) of the cultivation containers (9) to the time of harvesting as will be explained below.

As shown in FIG. 11 to FIG. 13, the stalks are grown from the seeds upwardly and gradually toward the ceiling of the cultivation room (11) to form a cluster of plants. While the roots extended from the seeds extend along the bottom face of the cultivation room (11) and touch the sides of the cultivation room and form an entangled or entwined clamp.

In this manner, the roots expand into a clump within the cultivation room and entangle with each other as the extension of the roots is limited.

A number of stalks and roots of the plants grown in the cultivation room become tangled in a ball-like clump thus making the harvesting easy.

When a polyurethane material or sponge material and the like is layed upon the lower face of the cultivation room (11) on which the seeds are scattered to cultivate the plant, the roots are twisted and entwined with respect to each other and into the urethane material so that the plants or vegetables in the cultivation room can be collected with ease.

Shipping Step (see FIG. 1)

The grown plants are shipped on the fourth or fifth day counting from the feed scattering day of the first day and the stoppage member (81), which is installed in the pool (74), opens and the cultivation containers (9) are taken from the pool (74) to transfer them to a shipping work table (111) through a shipping roller conveyor (110).

The plants (13) are taken out in a cluster on the work table (111), washed with water, and then if necessary excess roots and vegetable part of poor color are removed, and plants or vegetables are contained or packaged in a package container (112) as shown in FIGS. 20–22. The container (112) is made of plastic or other material and the like, corrugated cardboard box or bag or other bags, and the containers are distributed to the dealers and the wholesalers and the end users (for example, Sushi shops, restaurants, fish shops, homes and the like).

The plants or vegetables (13) are contained either in a flat condition (see FIGS. 20 and 21) or in an upright or erect condition (see FIG. 22).

The package container (112) as shown in FIG. 22 for containing the plants in an upright condition can be used as well as the cultivation container (9).

The cultivation container (9) shown in FIG. 23 has an outer box (113) and a partition (114) comprised of grating contained within the box (113). The plants are grown in the partitioned rooms (115). However, by providing side walls around the partition (114), it is possible to grow the plants in the cultivation factory (1).

The cultivation containers (9) are recovered after shipping and washed and thus can be used repeatedly.

Another water supply device (84') is shown in FIG. 24 and the device can be used for the aforedescribed water supply device (29) and the water supply device (84), or as a supplemental device together with them.

The water supply device (84') is provided with a container (117) containing cultivation liquid. The cultivation containers (9) are conveyed through the conveying system by one or a plurality of chain conveyers (118) installed in the container (117), a roller conveyer or a belt conveyer and the like. During the conveying motion, the cultivation containers (9) are guided through a stationary frame (119).

On the container (117), a tank (121) is mounted to contain the cultivation liquid (31) sucked through the sucking pipe (120) by a pump. The volume of the cultivation liquid is controlled through a cock (123) and a nozzle (122) installed under the tank (122) to spray or discharge in a bundle shape. Thus, the cultivation liquid is supplied in sequence to the plants (13) in the cultivation containers (9). The cultivation liquid (31) in the tank (121) returns to the container (117) through a return pipe (124).

When the whole cultivation process of the vegetables or plants is done in the cultivation factory (1) (see FIG. 25), the cultivation factory is divided into different cultivation times and the plants (13) in sequence are sent along the cultivation step direction (shown by the arrow).

In this case, the cover (62) is installed on the covered area of the cultivation factory (1) and the supplying of the cultivation liquid is controlled so as to fit each cultivation time.

The cover (62) is provided only at the light prohibition area of the cultivation factory (1') and the water supply condition is controlled so as to suit the particular time. The cover (62) can be used to cover the whole area of the factory and either a light-admitting condition or light-blocking condition is selected by closing or opening the cover.

The volume of the water supply can be controlled, and the water supply device (84) or a separate water supply device can be installed for each individual area.

Figure 25:
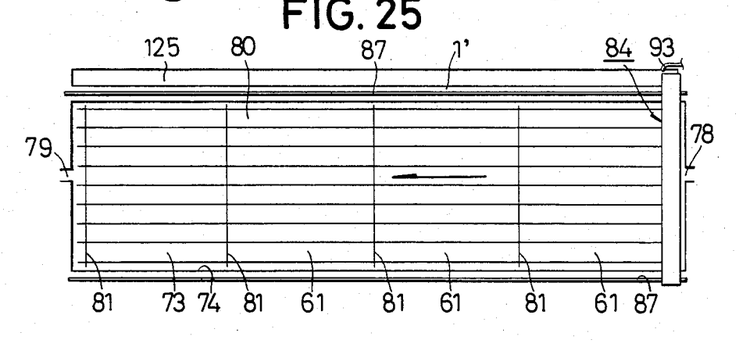
FIG. 25 is a plan view of another embodiment of the cultivation factory.

In the case of the cultivation factory (1') shown in FIG. 25, the cultivation liquid (31') is sucked and supplied from a water tank (125) placed in the factory (1') and a pump (not shown).

In the factory (1,1'), the cultivation liquid (31) is filled at the cultivation factory, and a hole is formed at the bottom of the cultivation containers (9). The cultivation liquid (31) is sucked through the holes to cultivate the plants in the cultivation containers (9).

Figures 20, 22, 26:
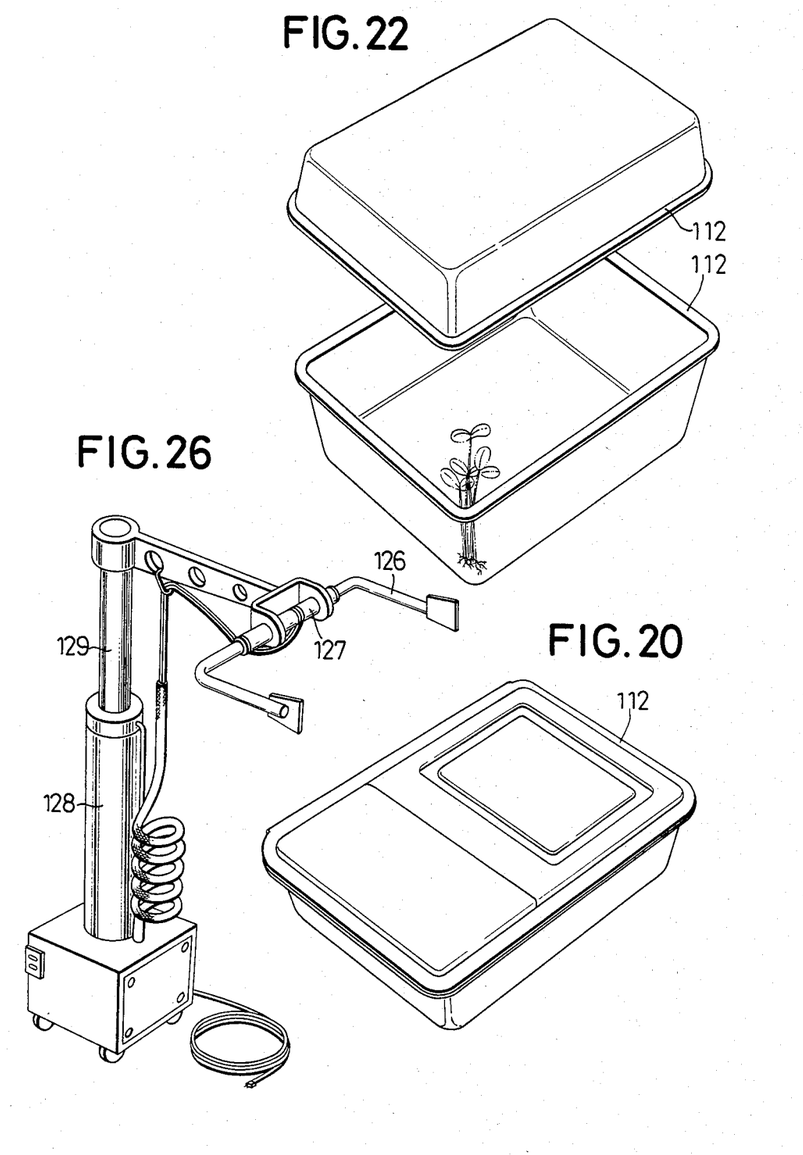
FIG. 20 is an enlarged perspective view of a packaging container in which the grown plants are contained.
FIG. 22 shows an enlarged section of another embodiment of the packaging container.
FIG. 26 is a perspective view of a mechanism for stacking and leveling the cultivation containers.
Figure 21:
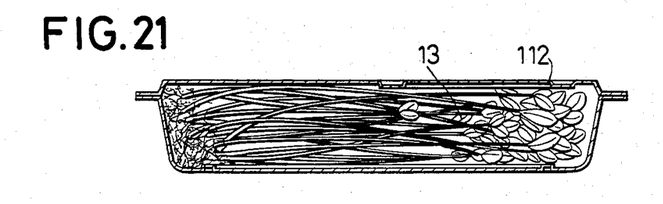
FIG. 21 shows a cross central sectional view of the packaging container.
Figure 23:
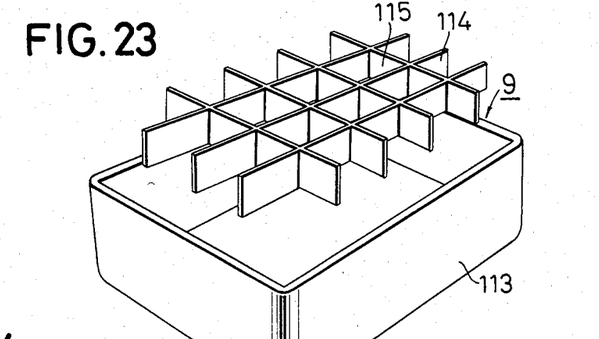
FIG. 23 is an exploded enlarged perspective view of another embodiment of the cultivation container.
Figure 24:
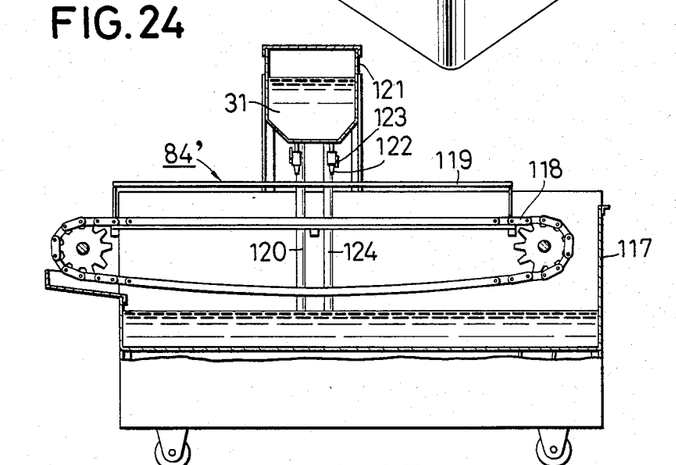
FIG. 24 is a partly broken section showing another embodiment of the water supplying device.

When the cultivation containers (9) are stacked or arranged flatly during water supplying, the cultivation containers are conveyed through a transfer apparatus (130) shown in FIG. 26. The handle (126) of the transfer apparatus can close and grip or be open and not grip the cultivation container (9) by the action of a piston cylinder (127).

A supporting pillar (128) is rotatable automatically and moved perpendicularly by the extensible motion of a piston cylinder (129). The piston cylinders (127, 129) are operative by air and can also be operable using oil pressure electric magnetism and the like. They are effected automatically by means of other means.

The conveying motions, cultivation time, room temperature, humidity, water supply time, water supply volume, and the opening or closing operation of the cover (62) are controlled centrally through a computer (not shown).

The radish or other plants can be mass-produced effectively according to the cultivation method and apparatus of the present invention. Vegetables of high nutritive value and which are freshly grown and which contain much Vitamins A, C and which are of good shape can be obtained.

The cultivation method and apparatus according to the present invention can be applied to plants other than "Kaiware Daikon," a kind of radish, and can be applied, for example, to honewort, creson, malt, watercress, rape seedlings, a kind of Chinese cabbage and the like, and also to pansy, begonia, daisy, marigold and other flowers.

The cultivation method and apparatus of the invention can be used to cultivate seeds to young plants, or from young plants to grown-up plants.

I claim:

1. A water cultivation apparatus for sprouting seeds and growing young plants comprising: a cultivation housing having a cultivation start region and a cultivation ending region, said cultivation start region being effective to promote the growth of stalks and roots of young plants from seeds, and said cultivation ending region being disposed adjacent the cultivation start region and being effective to deepen the green color of the leaves of the young plants; a plurality of cultivation containers dimensioned to be stored and transported within the cultivation housing, each cultivation container having cultivation rooms for receiving seeds and for growing young plants from the seeds within the cultivation rooms and being configured to be stackable one atop another; said cultivation start region comprising an adjustable cover for adjustably limiting the amount of light to the young plants grown in the cultivation containers, a plurality of cultivation stands arranged in series for holding the cultivation containers in a stacked condition, a plurality of transfer stands for transferring the cultivation containers in a non-stacked condition serially from one condition stand to the next, and a device for supplying cultivation liquid to the young plants within the cultivation containers while the same are in the non-stacked condition on the transfer stands to effect the growth of the stalks and roots of the young plants; said cultivation ending region comprising a water pool for holding the cultivation containers in a flat non-stacked condition so that the young plants in the cultivation containers can receive sufficient light and for effecting movement of the cultivation containers therealong, and a supply apparatus to supply cultivation liquid to the cultivation containers in said water pool.

2. A water cultivation apparatus according to claim 1; wherein the cultivation containers are composed of water-resisting foamed plastic material, the cultivation containers having a plurality of cultivation rooms each having bottom and side walls which define a growing space in which the young plants grow upwardly in a cluster with their roots entwined.

3. A water cultivation apparatus according to claim 1; wherein said supply apparatus comprises a tank for storing the cultivation liquid therein; a base for supporting said tank, the base being mounted for movement along opposed edges of said water pool and being movable in the moving direction of the cultivation containers, a set of nozzles for controlling the discharge volume of the cultivation liquid to the young plants in the cultivation containers during movement of said base, and valve means for controlling the flow of the cultivation liquid through the set of nozzles.

4. A water cultivation apparatus according to claim 3; wherein said base of the supply apparatus is provided with a set of wheels guided along rails disposed on opposite sides of said water pool, and a speed reducer connected to a motor for driving said wheels to thereby effect movement of the base relative to the water pool.

5. Apparatus for growing clusters of plants from seeds comprising: a plurality of transportable containers each having a plurality of separated compartments in which are to be grown clusters of plants from seeds during use of the apparatus, the containers being floatable on water and configured to be stackable one atop another; seed scattering means for scattering seeds into the container compartments; a plurality of serially arranged elongate stands each having means for holding and transporting therealong groups of stacked seed-containing containers; transfer means for effecting the sequential transfer of the groups of seed-containing containers in a non-stacked condition serially from one stand to the next stand; first supply means coacting with the transfer means for supplying cultivation liquid to the container compartments while the containers are in a non-stacked condition and prior to the stacking of the containers in groups on the next serially arranged stand to promote the cultivation and growth of a cluster of plants from the seeds in each container compartment; means defining a water pool disposed downstream of the last stand of the serially arranged stands for receiving and transporting therealong the containers from the last stand, the containers being floatable on the water pool; and second supply means for supplying cultivation liquid to the container compartments while the containers are floating on the water pool to continue the cultivation and growth of the plant clusters within the container compartments.

6. An apparatus according to claim 5; wherein at least some of the stands have means for inclining the stand to effect sliding movement therealong of the groups of stacked containers.

7. An apparatus according to claim 5; further including means for controlling the amount of sunlight received by the growing plant clusters while the containers are stacked in groups on the stands.

8. An apparatus according to claim 5; wherein the second supply means comprises a base member, means mounting the base member for displacement relative to the water pool, a tank for storing cultivation liquid mounted on the base member for displacement therewith, means for effecting displacement of the base member, and means connected to the tank for supplying cultivation liquid to the container compartments of the containers floating on the water pool.

9. An apparatus according to claim 8; wherein the means connected to the tank comprises means for supplying cultivation liquid to the container compartments of the containers floating on the water pool during displacement of the base member.

10. An apparatus according to claim 8; wherein the means mounting the base member comprises a set of rails disposed along opposite sides of the water pool, and a set of wheels rotatably mounted on the base member and rollable along the rails.

11. An apparatus according to claim 5; wherein the means defining a water pool comprises means defining a water pool having a width dimension sufficient to permit a plurality of containers to float on the water pool in side-by-side relation and having a length dimension sufficient to permit a plurality of containers to float on the water pool in end-to-end relation.

12. An apparatus according to claim 11; including means for flowing water in the water pool from an upstream end to a downstream end thereof to effect the transporting of the containers along the water pool.

13. An apparatus according to claim 5; wherein the seed scattering means includes means for scattering a predetermined quantity of seeds into each container compartment.

14. An apparatus according to claim 5; wherein the seed scattering means includes means for simultaneously scattering the seeds into all of the compartments of a container.

15. An apparatus according to claim 14; wherein the seed scattering means includes means for scattering a predetermined quantity of seeds into each of the compartments of a container.

16. An apparatus according to claim 5; wherein the seed scattering means comprises a scale box insertable into the container above the separated compartments and having a plurality of seed-scattering ports arranged to open into respective ones of the compartments, and a slidable box for containing seeds and being slidably disposed within the scale box and having a plurality of holes therein, the holes being arranged so that when the slidable box is slid to a first position the holes align with respective ones of the seed-scattering ports to permit seeds contained in the slidable box to be scattered into the respective compartments and when the slidable box is slid to a second position the holes are not aligned with the seed-scattering ports thereby closing the ports.

17. An apparatus according to claim 16; wherein the scale box includes a plurality of hollow members extending downwardly thereof in alignment with respective ones of the seed-scattering ports, the hollow members being dimensioned to contact the bottom of the compartments when the scale box is inserted into the container thereby defining a predetermined quantity of seeds to be scattered in the compartments.

18. An apparatus according to claim 17; wherein the slidable box includes means disposed at the periphery of each hole to prevent trapping of seeds between the scale box and slidable box during sliding movement of the slidable box.

19. An apparatus according to claim 18; wherein the means to prevent trapping comprises a notch formed at the periphery of each hole.

20. An apparatus according to claim 16; wherein the slidable box includes means disposed at the periphery of each hole to prevent trapping of seeds between the scale box and slidable box during sliding movement of the slidable box.

* * * * *